(12) United States Patent
Burckhardt et al.

(10) Patent No.: US 10,941,164 B2
(45) Date of Patent: Mar. 9, 2021

(54) ALDIMINOSILANES

(71) Applicant: SIKA TECHNOLOGY AG, Baar (CH)

(72) Inventors: Urs Burckhardt, Zürich (CH);
Andreas Kramer, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/614,061

(22) PCT Filed: Jun. 19, 2018

(86) PCT No.: PCT/EP2018/066176
§ 371 (c)(1),
(2) Date: Nov. 15, 2019

(87) PCT Pub. No.: WO2018/234266
PCT Pub. Date: Dec. 27, 2018

(65) Prior Publication Data
US 2020/0148707 A1    May 14, 2020

(30) Foreign Application Priority Data
Jun. 19, 2017  (EP) .................... 17176685

(51) Int. Cl.
*C07F 7/18* (2006.01)
*C08G 18/10* (2006.01)
*C08G 18/28* (2006.01)
*C09D 175/04* (2006.01)
*C09J 175/04* (2006.01)
*C08K 5/5419* (2006.01)

(52) U.S. Cl.
CPC ............ *C07F 7/1804* (2013.01); *C08G 18/10* (2013.01); *C08G 18/289* (2013.01); *C09D 175/04* (2013.01); *C09J 175/04* (2013.01); *C08K 5/5419* (2013.01)

(58) Field of Classification Search
CPC ..... C07F 7/1804; C08G 18/10; C08G 18/289; C09D 175/04; C09J 175/04
See application file for complete search history.

(56) References Cited

FOREIGN PATENT DOCUMENTS

| DE | 3414877 A1 | 10/1985 |
|---|---|---|
| JP | 61229882 A  * | 10/1986 |
| WO | 2005/058921 A2 | 6/2005 |
| WO | 2015/003875 A1 | 1/2015 |

OTHER PUBLICATIONS

Dec. 24, 2019 International Preliminary Report on Patentability issued in International Patent Application No. PCT/EP2018/066176.
Aug. 23, 2018 International Search Report issued in International Patent Application No. PCT/EP2018/066176.

* cited by examiner

*Primary Examiner* — Yong L Chu
(74) *Attorney, Agent, or Firm* — Oliff PLC

(57) ABSTRACT

An aldiminosilane of the formula (I), to the use thereof as adhesion promoters and/or crosslinking agents, and to curable compositions including same. The aldiminosilane of the formula (I) is odorless, pH-neutral, liquid at room temperature, and has a low sensitivity to heat. The hydrolysis of the aldiminosilane proceeds relatively slowly, and the aldiminosilane is highly effective as an adhesion promoter. Furthermore, the aldiminosilane exhibits excellent compatibility with curable compositions based on isocyanates, epoxides, or silanes, whereby such compositions do not exhibit a propensity for migration effects such as bleeding or substrate soiling after being cured. In particular, isocyanate group-containing compositions containing the aldiminosilane of the formula (I) are highly storage-stable regardless of the storage temperature and the isocyanate used.

10 Claims, No Drawings

ALDIMINOSILANES

TECHNICAL FIELD

The invention relates to aldiminosilanes and to curable compositions comprising these, especially polyurethanes, and also to adhesives, sealants and coatings.

STATE OF THE ART

Aminosilanes (amino-functional organoalkoxysilanes) are known adhesion promoters and/or crosslinkers. They are often used in activators, primers, adhesives, sealants, coverings or coatings in the construction and manufacturing industries. Aminosilanes having primary amino groups are the most commonly used because of their easy preparability. But they have disadvantages. Owing to the relatively hydrophilic amino group, they have a tendency to unwanted moisture absorption, which can have an adverse effect on the adhesion of a cured mass to the substrate. Secondly, they are strongly basic and hence have a tendency to rapid self-condensation under the influence of moisture, which reduces their molecular mobility and thus also their adhesion-promoting effect in a mass applied in a thick layer. Finally, owing to the reactivity of the amino group, they can be used only to a very limited degree, if at all, in compositions having electrophilic reactive groups such as isocyanate or epoxy groups, since they are chemically bound and hence largely lose their adhesion-promoting effect and/or adversely affect the storage stability of the composition. It may therefore be advantageous to suitably modify the primary amino group of such aminosilanes.

The reaction with aldehydes or ketones to give iminosilanes is known, with blockage of the primary amino group such that it largely loses its basicity and nucleophilicity. By means of moisture, the imino group is hydrolyzed back to the amino group and the aldehyde or ketone is released.

But the iminosilanes known from the prior art have disadvantages. The blocking agents used are usually volatile and odorous aldehydes or ketones. Such iminosilanes are usually hydrolyzed very quickly on exposure to moisture, releasing the volatile and odorous blocking agent. They are therefore unsuitable for use in low-solvent or solvent-free products which, on curing, should not give off any intense odors or volatile compounds.

WO 2005/058921 describes aldiminosilanes obtained from aminosilanes and long-chain aliphatic aldehydes containing ester groups, and their use as adhesion promoters in polyurethane compositions. Although these iminosilanes do not cause any odor in the hydrolysis, they are thermally sensitive and therefore have only limited shelf life. Moreover, they are hydrolyzed very quickly under the influence of moisture, which limits their adhesion-promoting effect in polyurethane compositions applied in a thick layer. Furthermore, the nonvolatile aldehyde released has a tendency to exudation, which can seriously disrupt adhesion to compositions containing such aldiminosilanes.

SUMMARY OF THE INVENTION

It is therefore an object of the present invention to provide an iminosilane that overcomes the disadvantages of the prior art.

This object is achieved by the aldiminosilane of the formula (I) as described in claim 1. Its specific structure is responsible for a whole range of surprising properties of the aldiminosilane itself and curable compositions obtained therewith.

The aldiminosilane of the formula (I) is odorless, liquid at room temperature and of comparatively low viscosity, even when the parent aldehyde is solid at room temperature. This is very surprising since aldimines of aromatic aldehydes are often solids at room temperature. Its hydrolysis is comparatively slow, which has an extremely positive effect on effectiveness as an adhesion promoter in curable compositions, since it remains mobile for a long time and thus has time to reach the interface to the substrates from the interior of a composition applied in a thick layer. Furthermore, the aldiminosilane has excellent compatibility with curable compositions based on isocyanates, epoxides or silanes, which means that such compositions, after curing, do not show a tendency to migration effects such as exudation or substrate contamination. This is very surprising, firstly because the aldehyde released from the aldiminosilane is nonvolatile and remains in the composition, has a comparatively high molecular weight and is therefore present in a comparatively high proportion by weight, and secondly because its markedly hydrophobic alkyl or alkoxy substituent would if anything suggest poor compatibility with hydrophilic polymer skeletons having hydrogen bonds, such as polyurethanes or polyepoxides.

The aldiminosilane of the formula (I) enables primer compositions with a wide range of possible flashoff times, especially including very long flashoff times of a few days to weeks. In the case of very long flashoff times, with prior art aldiminosilanes that release aldehydes of low volatility, limited adhesion of compositions applied thereto is often observed.

Compositions containing isocyanate groups and comprising the aldiminosilane of the formula (I) are very storage-stable, irrespective of the storage temperature and the isocyanate used. This is surprising since benzaldehyde-releasing aldiminosilanes described in the prior art have limited storage stability.

Further aspects of the invention are the subject of further independent claims. Particularly preferred embodiments of the invention are the subject of the dependent claims.

Ways of Executing the Invention

The invention provides an aldiminosilane of the formula (I)

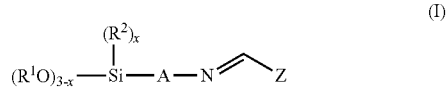

(I)

where
x is 0 or 1 or 2,
$R^1$ is a monovalent aliphatic or cycloaliphatic or arylaliphatic hydrocarbyl radical optionally containing ether groups and having 1 to 12 carbon atoms,
$R^2$ is a monovalent hydrocarbyl radical having 1 to 12 carbon atoms,
A is an alkylene radical optionally having ether oxygen or amine nitrogen and having 1 to 12 carbon atoms, and
Z is an aryl radical substituted by an alkyl or alkoxy group and having a total of 12 to 26 carbon atoms.

"Silane" refers to organoalkoxysilanes bearing one to three organic substituents on the alkoxysilane group. Silanes bearing one or more amino, aldimino or epoxy groups on an organic radical in addition to the silane group are referred to as "aminosilane", "aldiminosilane" or "epoxysilane".

A "silane group" refers to a silyl group bonded to an organic radical and having one to three, especially two or three, alkoxy radicals on the silicon atom.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

"Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is typically determined by means of gel permeation chromatography (GPC) against polystyrene as standard.

A dotted line in the formulae in each case represents the bond between a substituent and the corresponding molecular radical.

Substance names beginning with "poly", such as polyamine, polyol or polyisocyanate, refer to substances containing, in a formal sense, two or more of the functional groups that occur in their name per molecule.

A substance or composition is referred to as "storage-stable" or "storable" when it can be stored at room temperature in a suitable container over a prolonged period, typically over at least 3 months to up to 6 months or more, without any change in its application or use properties to a degree of relevance for the use thereof as a result of the storage.

"Room temperature" refers to a temperature of 23° C.

Preferably, x is 0 or 1, especially 0.

$R^1$ is preferably an alkyl radical optionally having ether groups and having 1 to 10 carbon atoms.

$R^1$ is more preferably methyl or ethyl.

Aldiminosilanes having methoxy groups have the advantage here that they are particularly reactive.

Aldiminosilanes having ethoxy groups have the advantage that they are somewhat less reactive, which simplifies their preparation and can enhance their adhesion-promoting effect, and they are toxicologically advantageous.

$R^2$ is preferably an alkyl radical having 1 to 8 carbon atoms, especially methyl.

The preferred silane groups are particularly reactive and enable particularly good adhesion.

A is preferably an alkylene radical optionally having one or two secondary amino groups and having 1 to 8 carbon atoms.

In particular, A is selected from the group consisting of methylene, 1,3-propylene, 4-aza-1,6-hexylene, 4,7-diaza-1,9-nonylene, 2-methyl-1,3-propylene, 1,4-butylene, 3-methyl-1,4-butylene and 3,3-dimethyl-1,4-butylene, where the numbering starts from the silicon atom.

More preferably, A is 1,3-propylene or 4-aza-1,6-hexylene, where the numbering starts from the silicon atom.

Most preferably, A is 1,3-propylene.

The preferred radicals A are particularly easily available and enable particularly good adhesion.

Z is preferably a radical of the formula (II)

(II)

where R is an alkyl or alkoxy radical having 6 to 20, preferably 8 to 16, carbon atoms.

R is preferably a branched radical. Such an aldiminosilane is of particularly low viscosity.

R is more preferably a branched alkyl radical having 10 to 14 carbon atoms or a branched alkoxy radical having 8 to 12 carbon atoms.

R is especially a branched alkyl radical having 10 to 14 carbon atoms.

Most preferably, R is a radical of the formula

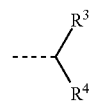

where $R^3$ and $R^4$ are each an alkyl radical and together have 9 to 13 carbon atoms.

R is preferably in the meta or para position.

More preferably, R is in the para position.

Most preferably, Z is thus a radical of the formula (II a)

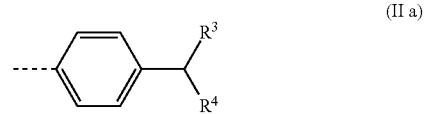

(II a)

where $R^3$ and $R^4$ have the definitions given.

The preferred Z radicals are particularly readily obtainable and enable aldiminosilanes of the formula (I) that are liquid at room temperature and of particularly low viscosity.

The aldiminosilane of the formula (I) is preferably obtained from the reaction of at least one aminosilane of the formula (III) with at least one aldehyde of the formula (IV) in a condensation reaction with removal of water.

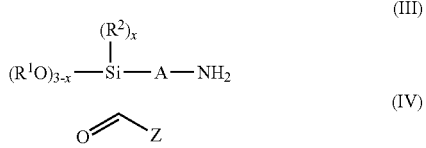

(III)

(IV)

where x, $R^1$, $R^2$, A and Z have the definitions already described.

The aldehyde of the formula (IV) is preferably used here in the form of an industrial mixture of molecules with different Z radicals.

The invention further provides a process for preparing the aldiminosilane of the formula (I), in which
  the aminosilane of the formula (III) is combined with the aldehyde of the formula (IV) to form a reaction mixture, using the aldehyde stoichiometrically or in stoichiometric excess in relation to the primary amino group of the aminosilane, and the water of condensation is removed from the reaction mixture by a suitable method, optionally with heating thereof.

Preferably, the water of condensation is removed physically or chemically from the heated reaction mixture by applying reduced pressure, especially by distillation under reduced pressure, by means of inorganic water binders such as molecular sieves, sodium sulfates or magnesium sulfates or calcium oxide, or by means of organic drying agents, for example orthoformic esters, vinyltrialkoxysilanes or orthosilicates.

The aldiminosilanes of the formula (I) obtained from this process typically contain proportions of oligomeric aldiminosilanes which result from hydrolysis and condensation reactions of the silane groups with the water resulting from the imine condensation.

The aldiminosilane of the formula (I) can also be deliberately partly or fully converted to oligomeric forms if desired, especially by aftertreatment in the presence of water, preferably with removal of the alcohol released by hydrolysis.

The invention further provides a further process for preparing the aldiminosilane of the formula (I), in which
the aldehyde of the formula (IV) is first combined with a volatile primary monoamine to form a reaction mixture, using the aldehyde stoichiometrically or in stoichiometric excess in relation to the primary amino group,
the water of condensation and any excess amine are removed from the reaction mixture by a suitable method, optionally with heating thereof,
then the resulting aldimine intermediate is combined with the aminosilane of the formula (III) to form a reaction mixture, using the aminosilane stoichiometrically or in stoichiometric excess in relation to the aldimino group of the aldimine intermediate,
and finally the reaction mixture is heated and the volatile primary monoamine released and any excess aminosilane is removed from the reaction mixture by a suitable method, especially under reduced pressure.

This process is somewhat more complex in its performance, but on the other hand the product obtained therefrom is largely or completely free of oligomeric aldiminosilanes and therefore of particularly low viscosity and mobile.

A suitable volatile primary monoamine for this process is especially propylamine, isopropylamine or butylamine.

Suitable aminosilanes of the formula (III) are especially aminomethyltrimethoxysilane, aminomethyldimethoxymethylsilane, 3-aminopropyltrimethoxysilane, 3-aminopropyldimethoxymethylsilane, N-(2-aminoethyl)-3-aminopropyltrimethoxysilane, N-(2-aminoethyl)-3-aminopropyldimethoxymethylsilane, N-(2-aminoethyl)-N'-[3-(trimethoxysilyl)propyl]ethylenediamine, 3-amino-2-methylpropyltrimethoxysilane, 3-amino-2-methylpropyldimethoxymethylsilane, 4-aminobutyltrimethoxysilane, 4-aminobutyldimethoxymethylsilane, 4-amino-3-methylbutyltrimethoxysilane, 4-amino-3-methylbutyldimethoxymethylsilane, 4-amino-3,3-dimethylbutyltrimethoxysilane, 4-amino-3,3-dimethylbutyldimethoxymethylsilane, or analogs thereof having ethoxy groups in place of the methoxy groups on the silicon.

Preference is given to 3-aminopropyltrimethoxysilane, 3-aminopropyltriethoxysilane, 3-aminopropyldimethoxymethylsilane, N-(2-aminoethyl)-3-aminopropyltrimethoxysilane, N-(2-aminoethyl)-3-aminopropyltriethoxysilane or N-(2-aminoethyl)-3-aminopropyldimethoxymethylsilane.

These aminosilanes are particularly readily available and show particularly good properties as adhesion promoters. Particularly preference is given to 3-aminopropyltrimethoxysilane, 3-aminopropyltriethoxysilane or 3-aminopropyldimethoxymethylsilane.

A preferred aldehyde of the formula (IV) is an aldehyde of the formula (IV a) where R has the definitions already described.

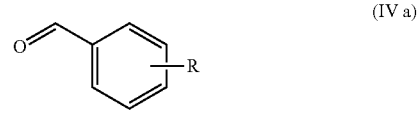

(IV a)

A particularly preferred aldehyde of the formula (IV) is an aldehyde of the formula (IV b) where $R^3$ and $R^4$ have the definitions already described.

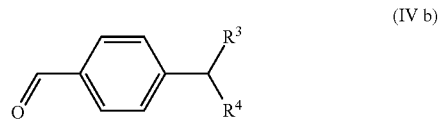

(IV b)

Preferred aldehydes of the formula (IV) are benzaldehydes that bear, in the 3 or 4 position, especially in the 4 position, a branched alkyl or alkoxy radical having 6 to 20, especially 8 to 16, carbon atoms, especially 4-octylbenzaldehyde, 4-nonylbenzaldehyde, 4-decylbenzaldehyde, 4-undecylbenzaldehyde, 4-dodecylbenzaldehyde, 4-tridecylbenzaldehyde, 4-tetradecylbenzaldehyde, 4-pentadecylbenzaldehyde, 4-hexadecylbenzaldehyde, 4-hexyloxybenzaldehyde, 4-heptyloxybenzaldehyde, 4-octyloxybenzaldehyde, 4-nonyloxybenzaldehyde, 4-decyloxybenzaldehyde, 4-undecyoxybenzaldehyde, 4-dodecyloxybenzaldehyde, 4-tridecyloxybenzaldehyde or 4-tetradecyloxybenzaldehyde, where the 4-alkyl and alkoxy radicals are each branched.

Particularly preferred aldehydes of the formula (IV) are benzaldehydes that bear a branched $C_{10-14}$-alkyl radical in the 3 or 4 position, especially in the 4 position, especially 4-decylbenzaldehyde, 4-undecylbenzaldehyde, 4-dodecylbenzaldehyde, 4-tridecylbenzaldehyde or 4-tetradecylbenzaldehyde.

Most preferred as aldehyde of the formula (IV) is a mixture comprising 4-decylbenzaldehydes, 4-undecylbenzaldehydes, 4-dodecylbenzaldehydes, 4-tridecylbenzaldehydes or 4-tetradecylbenzaldehydes, the alkyl radicals of which are mainly branched.

The aldehyde of the formula (IV) is especially obtainable from the formylation of at least one alkyl- and/or alkoxy-substituted aromatic hydrocarbon with carbon monoxide under the action of an acid catalyst. An example of a suitable acid catalyst is the $HCl$—$AlCl_3$ system (Gattermann-Koch reaction).

In a preferred preparation process, the formylation is conducted with $HF$—$BF_3$ as acid catalyst. This is advantageous since this process proceeds particularly selectively and the aldehyde of the formula (IV) can be separated from the reaction mixture without a hydrolysis step and the catalyst can be reused, which means that costly and inconvenient product workup and disposal of waste is dispensed with.

Preferably, the aldiminosilane of the formula (I) is a mixture of aldiminosilanes of the formula (I) in which each Z is a radical of the formula (II) and R is selected from mainly branched alkyl radicals having 6 to 20 carbon atoms. R is more preferably selected from mainly branched 4-decyl, 4-undecyl, 4-dodecyl, 4-tridecyl and 4-tetradecyl radicals.

The invention thus further provides a mixture of aldiminosilanes of the formula (I) in which each Z is a radical of the formula (II) and R is selected from mainly branched 4-decyl, 4-undecyl, 4-dodecyl, 4-tridecyl and 4-tetradecyl radicals. A mixture of this kind is particularly easily industrially obtainable.

In a preferred embodiment of the invention, the aldiminosilane of the formula (I) forms part of a mixture with at least one aldimine of the formula (V)

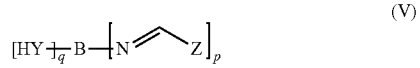    (V)

where
p is an integer from 1 to 4, q is 0 or 1 and (p+q) is an integer from 2 to 4,
B is a (p+q)-valent aliphatic, cycloaliphatic or arylaliphatic hydrocarbyl radical optionally containing ether oxygen or amine nitrogen and having a molecular weight in the range from 28 to 6,000 g/mol,
Y is O, S or $NR^O$ where $R^O$ is a hydrogen radical or is a monovalent hydrocarbyl radical which has 1 to 30 carbon atoms and optionally has at least one carboxylic ester, nitrile, nitro, phosphonic ester, sulfone or sulfonic ester group or an aldimino group of the formula

where Z has the definitions already described.

Preferably, q is 0 and p is 2 or 3, especially 2.

The components of the mixture can be prepared together, or they can be prepared separately and then blended. Preference is given to a process in which the aldiminosilane of the formula (I) is prepared as described in the first process in an aldimine of the formula (V).

The aldiminosilane of the formula (I) has the features that it is odorless, pH-neutral, liquid at room temperature and comparatively insensitive to heat and thus can be stored, transported and processed in a particularly simple manner. On contact with moisture, the silane groups present can be hydrolyzed to silanol groups (Si—OH groups) and can form siloxane groups (Si—O—Si groups) by subsequent condensation reactions.

The aldiminosilane of the formula (I) has the ability to develop strong adhesion to various substrates or to improve the development of adhesion of a polymer composition to a substrate.

The aldiminosilane of formula (I) can be used as an active ingredient or as an intermediate in chemical processes.

The aldiminosilane of the formula (I) is preferably used as adhesion promoter and/or crosslinker for curable compositions.

The invention further provides for the use of at least one aldiminosilane of the formula (I) as adhesion promoter and/or crosslinker.

It is a feature of this use that the aldiminosilane has high efficacy as adhesion promoter, specifically also in compositions applied in layers, and can develop good adhesion to various substrates even in a small dose. This can be promoted in that the aldiminosilane is hydrolyzed relatively slowly, and hence remains mobile for a long time and hence has time to get from the interior of a composition to the interface to the substrates. In the absence of water or moisture, it does not trigger crosslinking reactions of the reactive groups, especially isocyanate or epoxy or silane groups, and can therefore also be used in compounds containing isocyanate or epoxide or silane without shortening their shelf life. The aldiminosilane can also be used in the presence of basic compounds, especially those having free amino groups, as used, for example, as epoxy curing agents or for in situ thixotroping of polyurethanes, since it does not bear any base-sensitive groups. The aldehyde released after the hydrolysis of the aldimino group is of low volatility and stable to hydrolysis and thus does not cause any troublesome odor nuisance. Moreover, it has good compatibility with many polymers, which means that it neither exudes nor soils the substrates.

In one embodiment of the invention, the aldiminosilane of the formula (I) is used as constituent of an adhesion promoter solution or of an activator which additionally contains at least one solvent and optionally further adhesion promoters.

Such an adhesion promoter solution is applied to a substrate as a thin film, especially with a cloth or felt, and optionally subsequently wiped off again, with coating of the substrate, after a suitable flashoff time, with a curable composition, especially an adhesive. This pretreatment of the substrate improves the adhesion of the adhesive applied thereto.

In order to accelerate the hydrolysis of the aldimino groups and/or the silane groups, it may be advantageous to combine the aldiminosilane of the formula (I) with suitable catalysts.

The invention further provides a composition comprising
at least one aldiminosilane of the formula (I), and
at least one monomer and/or polymer having crosslinkable reactive groups.

Such a composition is also referred to as "curable composition".

The crosslinkable reactive groups are especially selected from isocyanate groups, epoxy groups and silane groups.

Preference is given to isocyanate groups and/or silane groups.

The composition more preferably contains isocyanate groups.

Most preferably, the composition is a composition containing isocyanate groups that comprises at least one polyisocyanate and/or at least one polymer containing isocyanate groups.

A suitable polyisocyanate is especially a commercially available polyisocyanate, especially
commercially available diisocyanates, especially hexamethylene 1,6-diisocyanate (HDI), 1-isocyanato-3,3,5-trimethyl-5-isocyanatomethylcyclohexane (IPDI), perhydro(diphenylmethane 2,4'- and/or 4,4'-diisocyanate) ($H_{12}MDI$), tolylene 2,4- or 2,6-diisocyanate or any mixtures of these isomers (TDI), diphenylmethane 4,4'- or 2,4'- or 2,2'-diisocyanate or any mixtures of these isomers (MDI),
forms of MDI that are liquid at room temperature, especially 4,4'-MDI liquefied by partial chemical modification—especially carbodiimidization or uretonimine formation or adduct formation with polyols—or mixtures of 4,4'-MDI with other MDI isomers (2,4'-MDI and/or 2,2'-MDI), and/or with MDI oligomers and/or MDI homologs (PMDI), that have been brought about selectively by blending or result from the production process, oligomers or derivatives of the isocyanates mentioned, especially derived from HDI, IPDI, MDI or TDI, especially oligomers containing uretdione or isocyanurate or iminooxadiazinedione groups or various groups among these; or di- or polyfunctional derivatives containing ester or urea or urethane or biuret or allophanate or carbodiimide or uretonimine or oxadiazinetrione groups or various groups among these. In practice, polyisocyanates of this kind are typically mixtures of substances having different degrees of oligomerization and/or chemical structures. They especially have an average NCO functionality of 2.1 to 4.0.

A particularly preferred polyisocyanate is HDI, IPDI, TDI or MDI.

Most preferred is IPDI, TDI or MDI.

A suitable polyurethane polymer containing isocyanate groups is especially obtained from the reaction of at least one polyol with a superstoichiometric amount of at least one polyisocyanate. The reaction is preferably conducted with exclusion of moisture at a temperature in the range from 50 to 160° C., optionally in the presence of suitable catalysts. The NCO/OH ratio is preferably in the range from 1.3/1 to 5/1, preferably 1.5/1 to 4/1, especially 1.8/1 to 3/1. The polyisocyanate remaining in the reaction mixture after the conversion of the OH groups, especially monomeric diisocyanate, can be removed, especially by means of distillation, which is preferable in the case of a high NCO/OH ratio. The polyurethane polymer obtained preferably has a content of free isocyanate groups in the range from 1% to 10% by weight, especially 1.5% to 6% by weight. The polyurethane polymer can optionally be prepared with additional use of plasticizers or solvents, in which case the plasticizers or solvents used do not contain any groups reactive toward isocyanates.

Preference is given, as polyisocyanate for the preparation of a polyurethane polymer containing isocyanate groups, to the polyisocyanates already mentioned, especially the diisocyanates, especially MDI, TDI, IPDI or HDI.

Suitable polyols are commercial polyols or mixtures thereof, especially polyether polyols, especially polyoxyalkylenediols and/or polyoxyalkylenetriols, especially polyoxypropylenediols or polyoxypropylenetriols, or what are called ethylene oxide-terminated (EO-endcapped) polyoxypropylenediols or -triols, or those having polymer particles dispersed therein, especially having styrene-acrylonitrile particles (SAN), polyester polyols, especially from the polycondensation of hydroxycarboxylic acids or lactones or from the polycondensation of aliphatic and/or aromatic polycarboxylic acids with di- or polyhydric alcohols, especially polyester diols from the reaction of hexane-1,6-diol or neopentyl glycol with adipic acid, sebacic acid or dodecanedicarboxylic acid, polycarbonate polyols, especially from the reaction of hexane-1,6-diol or neopentyl glycol with dialkyl carbonates, diaryl carbonates or phosgene, block copolymers, bearing at least two hydroxyl groups, of polyether, polyester and/or polycarbonate blocks, especially polyetherpolyester polyols, polyacrylate polyols and polymethacrylate polyols, polyhydroxy-functional fats and oils, polyhydrocarbon polyols, in particular polyhydroxy-functional polyolefins, polyisobutylenes, polyisoprenes, ethylene-propylene, ethylene-butylene or ethylene-propylene-diene copolymers, polymers of dienes, or copolymers thereof.

Also especially suitable are mixtures of polyols.

Preference is given to polyether polyols, polyester polyols, polycarbonate polyols, poly(meth)acrylate polyols or polybutadiene polyols.

Particular preference is given to polyether polyols, especially polyoxypropylenedi- or -triols or ethylene oxide-terminated polyoxypropylenedi- or -triols.

Preference is given to polyols having an average molecular weight in the range from 400 to 20 000 g/mol, preferably from 1000 to 10 000 g/mol.

Preference is given to polyols having an average OH functionality in the range from 1.6 to 3.

Preference is given to polyols that are liquid at room temperature.

Preference is given to polyols which are solid at room temperature for the preparation of a polyurethane polymer which is solid at room temperature.

The polyurethane polymer containing isocyanate groups preferably has an average molecular weight in the range from 1,000 to 20,000 g/mol, especially 1,500 to 10,000 g/mol.

It is preferably liquid at room temperature.

For use in a hotmelt adhesive, preference is given to a polyurethane polymer which is solid at room temperature and has been prepared proceeding from at least one polyol which is solid at room temperature. A suitable polyol which is solid at room temperature is crystalline, semicrystalline or amorphous at room temperature. Its melting point is preferably in the range from 50 to 180° C., especially 70 to 150° C. Preference is given to polyester polyols or acrylate polyols. The polyurethane polymer is especially prepared at a temperature above the melting point of the polymer which is solid at room temperature.

The composition preferably comprises at least one polyurethane polymer containing isocyanate groups.

In addition to a polyurethane polymer comprising isocyanate groups, the composition can furthermore contain at least one diisocyanate and/or one oligomer or polymer of a diisocyanate, especially an IPDI isocyanurate or a TDI oligomer or a mixed isocyanurate based on TDI/HDI or an HDI oligomer or a form of MDI which is liquid at room temperature.

Preferably, the composition comprises, as well as at least one aldiminosilane of the formula (I) and at least one polyisocyanate and/or polyurethane polymer containing isocyanate groups, additionally one or more further constituents that are especially selected from catalysts, fillers, plasticizers and solvents.

Suitable catalysts are especially catalysts for the hydrolysis of aldimino groups, especially organic acids, especially aromatic carboxylic acids such as benzoic acid, 2-nitrobenzoic acid or salicylic acid.

Suitable catalysts are furthermore catalysts for the acceleration of the reaction of isocyanate groups, especially organotin(IV) compounds, such as especially dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, complexes of bismuth(III) or zirconium(IV), especially with ligands selected from alkoxides, carboxylates, 1,3-diketonates, oxinate, 1,3-ketoesterates and 1,3-ketoamidates, or compounds containing tertiary amino groups, such as especially 2,2'-dimorpholinodiethyl ether (DMDEE).

Also especially suitable are combinations of different catalysts.

Suitable fillers are especially ground or precipitated calcium carbonates, optionally coated with fatty acids, especially stearates, barytes, quartz flours, quartz sands, dolomites, wollastonites, kaolins, calcined kaolins, sheet silicates, such as mica or talc, zeolites, aluminum hydroxides, magnesium hydroxides, silicas, including finely divided silicas from pyrolysis processes, cements, gypsums, fly ashes, industrially produced carbon blacks, graphite, metal powders, for example of aluminum, copper, iron, silver or steel, PVC powders or hollow beads.

Suitable plasticizers are especially carboxylic acid esters, such as phthalates, especially diisononyl phthalate (DINP), diisodecyl phthalate (DIDP) or di(2-propylheptyl) phthalate (DPHP), hydrogenated phthalates, especially hydrogenated diisononyl phthalate or diisononyl cyclohexane-1,2-dicarboxylate (DINCH), terephthalates, especially dioctyl terephthalate, trimellitates, adipates, especially dioctyl adipate, azelates, sebacates, benzoates, glycol ethers, glycol esters, organic phosphoric or sulfonic acid esters, polybutenes, polyisobutenes or plasticizers derived from natural fats or oils, especially epoxidized soybean or linseed oil.

Suitable solvents are especially acetone, methyl ethyl ketone, methyl n-propyl ketone, diisobutyl ketone, methyl isobutyl ketone, methyl n-amyl ketone, methyl isoamyl ketone, acetylacetone, mesityl oxide, cyclohexanone, methylcyclohexanone, ethyl acetate, propyl acetate, butyl acetate, n-butyl propionate, diethyl malonate, 1-methoxy-2-propyl acetate, ethyl 3-ethoxypropionate, diisopropyl ether, diethyl ether, dibutyl ether, diethylene glycol diethyl ether, ethylene glycol diethyl ether, ethylene glycol monopropyl ether, ethylene glycol mono(2-ethylhexyl) ether, acetals such as, in particular, methylal, ethylal, propylal, butylal, 2-ethylhexylal, dioxolane, glycerol formal or 2,5,7,10-tetraoxaundecane (TOU), and toluene, xylene, heptane, octane, naphtha, white spirit, petroleum ether or petroleum spirit, especially Solvesso™ products (from Exxon), and furthermore methylene chloride, propylene carbonate, butyrolactone, N-methylpyrrolidone or N-ethylpyrrolidone.

The composition may comprise further additives commonly used for polyurethane compositions. More particularly, the following auxiliaries and additives may be present:

- inorganic or organic pigments, especially titanium dioxide, chromium oxides or iron oxides;
- fibers, especially glass fibers, carbon fibers, metal fibers, ceramic fibers, polymer fibers, such as polyamide fibers or polyethylene fibers, or natural fibers, such as wool, cellulose, hemp or sisal;
- dyes;
- desiccants, especially molecular sieve powder, calcium oxide, highly reactive isocyanates, such as p-tosyl isocyanate, monomeric diisocyanates or orthoformic acid esters;
- further adhesion promoters, especially further silanes, especially epoxysilanes, such as especially 3-glycidoxypropyltrimethoxysilane or 3-glycidoxypropyltriethoxysilane, (meth)acrylosilanes, anhydridosilanes, carbamatosilanes, alkylsilanes or further iminosilanes, or oligomeric forms of these silanes, or titanates;
- latent hardeners or crosslinkers, especially aldimines, ketimines, enamines, or oxazolidines;
- further catalysts which accelerate the reaction of the isocyanate groups;
- rheology modifiers, especially thickeners, especially sheet silicates, such as bentonites, derivatives of castor oil, hydrogenated castor oil, polyamides, polyamide waxes, polyurethanes, urea compounds, fumed silicas, cellulose ethers or hydrophobically modified polyoxyethylenes;
- natural resins, fats or oils, such as rosin, shellac, linseed oil, castor oil or soybean oil;
- non-reactive polymers, especially homo- or copolymers of unsaturated monomers, especially from the group comprising ethylene, propylene, butylene, isobutylene, isoprene, vinyl acetate or alkyl (meth)acrylates, especially polyethylenes (PE), polypropylenes (PP), polyisobutylenes, ethylene-vinyl acetate copolymers (EVA) or atactic poly-α-olefins (APAO);
- flame-retardant substances, especially the already mentioned fillers aluminum hydroxide or magnesium hydroxide, and especially organic phosphoric esters;
- additives, especially wetting agents, leveling agents, defoamers, deaerators, stabilizers against oxidation, heat, light or UV radiation, or biocides;
- or further substances customarily used in moisture-curing compositions.

It may be advisable to chemically or physically dry certain substances before mixing them into the composition.

In particular, the composition may comprise, in addition to at least one aldiminosilane of the formula (I), oxazolidines or further aldimines, especially those derived from aldehydes of the formula (IV), especially the aldimines of the formula (V) already mentioned.

Preferred further aldimines are especially those derived from aliphatic or arylaliphatic di- or triamines and 2,2-dimethyl-3-lauroyloxypropanal or 2,2-dimethyl-3-morpholinopropanal.

The composition preferably contains a content of polyisocyanates and of polyurethane polymers containing isocyanate groups in the range from 5% to 90% by weight, especially 10% to 80% by weight.

The composition preferably contains a content of aldiminosilanes of the formula (I) in the range from 0.01% to 10% by weight, preferably 0.1% to 5% by weight, especially 0.2% to 2.5% by weight.

The composition is especially produced with exclusion of moisture and stored at ambient temperature in moisture-tight containers.

The composition may be in the form of a one-component composition or in the form of a multi-component, especially two-component, composition.

A composition referred to as a "one-component" composition is one in which all constituents of the composition are in the same container and which is storage-stable per se.

A composition referred to as a "two-component" composition is one in which the constituents of the composition are in two different components which are stored in separate containers and are not mixed with one another until shortly before or during the application of the composition.

The composition is preferably a one-component composition. Given suitable packaging and storage, it is storage-stable, typically over several months, up to one year or longer.

On application of the composition, the process of curing commences. This results in the cured composition.

In the case of a one-component composition, it is applied as such and then begins to cure under the influence of moisture or water. For acceleration of the curing, an accelerator component which contains or releases water and/or a catalyst can be mixed into the composition on application, or the composition, after application thereof, can be contacted with such an accelerator component.

In the case of a two-component composition, it is applied after the mixing of the two components and begins to cure by internal reaction, and the curing may be completed by the action of external moisture. The two components can be mixed continuously or batchwise with dynamic mixers or static mixers.

In the course of curing, the isocyanate groups react under the influence of moisture with the amino groups released from the aldiminosilane of the formula (I) and any further aldimines or oxazolidines undergoing hydrolysis that are present. Further isocyanate groups react under the influence of moisture with one another and/or with any further reactive groups present in the composition. The silane groups present undergo hydrolysis on contact with moisture to form silanol groups (Si—OH groups) and can form siloxane groups (Si—O—Si groups) by subsequent condensation reactions. The totality of these reactions of isocyanate groups that lead to the curing of the composition is also referred to as crosslinking.

The moisture required for curing of a one-component composition preferably gets into the composition through diffusion from the air (air humidity).

The composition is preferably applied at ambient temperature, especially in the range from about 0 to 50° C., preferably in the range from 5 to 40° C. The composition is preferably likewise cured at ambient temperature.

In one embodiment, the composition is a reactive hotmelt adhesive. A hotmelt adhesive is preferably applied in the molten state at a temperature in the range from 80 to 180° C. The odorlessness of the aldehyde released from the aldiminosilane of the formula (I) is enormously advantageous here.

The curing releases an aldehyde of the formula (IV). It is substantially nonvolatile and odorless and remains for the most part in the cured composition. It behaves or acts like a plasticizer therein. As such, it can in principle itself migrate and/or affect the migration of further plasticizers. The aldehyde of the formula (IV) has very good compatibility with the cured composition, barely migrates itself, and also does not trigger any enhanced migration of plasticizers.

The composition is preferably an adhesive or a sealant or a coating.

The adhesive or sealant or coating is preferably elastic.

The composition is especially suitable as an adhesive and/or sealant for bonding and sealing applications, especially in the construction and manufacturing industries or in motor vehicle construction, especially for parquet bonding, installable component bonding, cavity sealing, assembly, module bonding, vehicle body bonding, window pane bonding or joint sealing. As coating, the composition is suitable for the protection of floors or walls, especially as coating of balconies, terraces, open spaces, bridges, parking levels, or for the sealing of roofs, or in the interior of buildings for water sealing, or as floor covering in kitchens, industrial buildings or manufacturing spaces, or as seal in collection tanks, channels, shafts or wastewater treatment plants, or for the protection of surfaces as varnish or seal, or as casting compound for cavity sealing, as seam seal or as protective coating for pipes, for example.

Further preferably, the composition is a primer. Such a primer is used for the pretreatment of substrates, as a bonding layer between the substrate and a composition to be applied thereto.

The primer preferably contains at least one solvent. The primer optionally contains further constituents, especially catalysts, further silanes, titanates or zirconates, or optionally pigments, fillers, wetting agents, polyurethane polymers containing silane groups, or epoxy resins.

The primer is typically applied so as to leave, after the evaporation of the solvents, a closed film in a layer thickness in the region of a few micrometers to a few hundred micrometers on the substrate. It is typically used to improve the adhesion between a substrate and an adhesive and/or sealant or coating by allowing the primer film to develop adhesion both to the substrate and to the curable composition applied to the primer film.

The primer is typically applied to a substrate surface in a thin layer with a brush or roller. After a suitable waiting time during which the solvent partly or completely evaporates, the adhesive or sealant or coating is applied to the surface thus pretreated and typically has improved adhesion.

Suitable substrates that can be bonded, sealed, coated or pretreated with the composition are especially

- glass, glass ceramic, concrete, mortar, fiber cement, especially fiber cement boards, brick, tile, gypsum, especially gypsum boards, or natural stone, such as granite or marble;
- repair or leveling compounds based on PCC (polymer-modified cement mortar) or ECC (epoxy resin-modified cement mortar);
- metals or alloys, such as aluminum, copper, iron, steel, nonferrous metals, including surface-finished metals or alloys, such as zinc-plated or chromium-plated metals;
- asphalt or bitumen;
- leather, textiles, paper, wood, wood materials bonded with resins, such as phenolic, melamine or epoxy resins, resin/textile composites or further materials called polymer composites;
- plastics, such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;
- fiber-reinforced plastics, such as carbon fiber-reinforced plastics (CFP), glass fiber-reinforced plastics (GFP) and sheet molding compounds (SMC);
- insulation foams, especially made of EPS, XPS, PUR, PIR, rock wool, glass wool or foamed glass;
- coated or painted substrates, especially painted tiles, coated concrete, powder-coated metals or alloys or painted metal sheets;
- paints or varnishes, especially automotive topcoats.

If required, the substrates can be pretreated prior to application, especially by physical and/or chemical cleaning methods or the application of an activator or a primer.

It is possible to bond and/or seal two identical or two different substrates.

The application and curing of the composition affords an article bonded or sealed or coated or pretreated with the composition.

The invention thus further provides an article bonded or sealed or coated or pretreated with the composition.

This article may be a built structure or a part thereof, especially a built structure in civil engineering above or below ground, a bridge, a roof, a staircase or a facade, or it may be an industrial good or a consumer good, especially a window, a pipe, a rotor blade of a wind turbine, a domestic appliance or a mode of transport, such as especially an automobile, a bus, a truck, a rail vehicle, a ship, an aircraft or a helicopter, or an installable component thereof.

It is a feature of the composition of the invention that it is particularly storage-stable, meaning that, even in the course of prolonged storage and/or at elevated storage or transport temperatures, it undergoes little change in its properties over time and remains usable as intended, especially also with regard to its ability to develop adhesion. The curing thereof proceeds without troublesome odor immissions. The composition develops elevated adhesion to various surfaces, especially those of inorganic substrates. In the cured state, it has good mechanical properties and does not tend to exudation.

The invention further provides a reaction product of at least one aldiminosilane of the formula (I).

A preferred reaction product is a product from the hydrolysis of at least one aldiminosilane of the formula (I). Such an aldiminosilane has one or two or three silanol groups (Si—OH).

A further preferred reaction product is a condensation product of at least one aldiminosilane of the formula (I) with at least one further silane. The further silane may likewise be an aldiminosilane of the formula (I), or it may be a further silane that does not conform to the formula (I). Such a condensation product contains at least one siloxane bond Si—O—Si. It is particularly suitable as an adhesion promoter, in the same way as described for the aldiminosilane of the formula (I).

A further preferred reaction product is the product from the hydrogenation of at least one aldiminosilane of the formula (I) with hydrogen. This gives rise to at least one secondary aldiminosilane of the formula (VI)

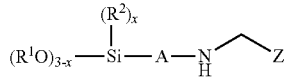

(VI)

where $R^1$, $R^2$, x, A and Z have the definitions already given.

A secondary aminosilane of the formula (VI) is particularly suitable as an adhesion promoter or as a crosslinker. It is also particularly suitable for the preparation of polymers containing silane groups by reaction with isocyanate groups.

EXAMPLES

Working examples are adduced hereinafter, which are intended to further elucidate the invention described. Of course, the invention is not limited to these described working examples.

"Standard climatic conditions" ("SCC") refer to a temperature of 23±1° C. and a relative air humidity of 50±5%.

Unless stated otherwise, the chemicals used were from Sigma-Aldrich.
Aldehydes Used:
Aldehyde-1: Fractionated aldehyde mixture obtained from formylation, catalyzed by means of HF—BF$_3$, of $C_{10-14}$-alkylbenzene, containing mainly branched 4-($C_{10-14}$-alkyl)benzaldehydes. (Average aldehyde equivalent weight 290 g/eq)
2,2-Dimethyl-3-lauroyloxypropanal
Aldehyde-1 is a mixture of aldehydes of the formula (IV).
Preparation of Aldiminosilanes:

Infrared spectra (FT-IR) were measured as undiluted films on a Nicolet iS5 FT-IR instrument from Thermo Scientific equipped with a horizontal ATR measurement unit with a diamond crystal. The absorption bands are reported in wavenumbers (cm$^{-1}$).

Gas chromatograms (GC) were measured within the temperature range of 60 to 320° C. with a heating rate of 15° C./min and a run time of 10 min at 320° C. The injector temperature was 250° C. A Zebron ZB-5 column was used (L=30 m, ID=0.25 mm, dj=0.5 μm) with a gas flow rate of 1.5 ml/min. Detection was by means of flame ionization (FID).

Viscosity was measured with a thermostated Rheotec RC30 cone-plate viscometer (cone diameter 50 mm, cone angle 1°, cone tip-plate distance 0.05 mm, shear rate 10 s$^{-1}$ for viscosities <150 Pa·s, shear rate 1 s$^{-1}$ for viscosities >150 Pa·s)).
Aldiminosilane A-1:

27.60 g of aldehyde-1 and 5.00 g of anhydrous magnesium sulfate formed an initial charge in a round-bottom flask under a nitrogen atmosphere. To this was slowly added dropwise 16.18 g of 3-aminopropyltrimethoxysilane while stirring and cooling. Then the reaction mixture was stirred at 70° C. for 30 min, the magnesium sulfate was filtered off, and then the reaction mixture was freed of volatile compounds on a rotary evaporator. A yellowish liquid having a viscosity at 20° C. of 146 mPa·s was obtained, which had a GC-determined purity of 94.3% (retention time 16.6-19.3 min) and a content of unconverted aldehyde-1 of 3.0% (retention time 12.3-14.8 min).

FT-IR: 2955, 2923, 2870, 2853, 2734, 1705, 1646, 1608, 1571, 1508, 1457, 1418, 1377, 1342, 1302, 1248, 1189, 1102, 1087, 1027, 1018, 940, 881, 865, 825, 777, 722, 699.
Aldiminosilane A-2:

The procedure was as described for aldiminosilane A-1, except that 20.00 g of 3-aminopropyltriethoxysilane was used instead of 3-aminopropyltrimethoxysilane. A yellowish liquid having a GC-determined purity of 90.5% (retention time 16.6-19.3 min) and a content of unconverted aldehyde-1 of 1.5% (retention time 12.3-14.8 min).

FT-IR: 2957, 2923, 2872, 2854, 2733, 1706, 1647, 1609, 1571, 1509, 1456, 1419, 1389, 1378, 1342, 1300, 1248, 1223, 1211, 1166, 1102, 1080, 1018, 991, 954, 878, 863, 827, 790, 775, 722.
Aldiminosilane R-1:

The procedure was as described for aldiminosilane A-1, except that 27.00 g of 2,2-dimethyl-3-lauroyloxypropanal was used rather than aldehyde-1. A yellowish liquid was obtained.

The aldiminosilanes A-1 and A-2 are inventive aldiminosilanes of the formula (I). The aldiminosilane R-1 is a comparative example according to WO 2005/058921.
Preparation of Polymers Containing Isocyanate Groups
Polymer P1:

400 g of polyoxypropylene diol (Acclaim® 4200, from Covestro; OH number 28.5 mg KOH/g) and 52 g of diphenylmethane 4,4'-diisocyanate (Desmodur® 44 MC L, from Covestro) were reacted by a known process at 80° C. to give an NCO-terminated polyurethane polymer which is liquid at room temperature and has a content of free isocyanate groups of 1.85% by weight and a viscosity at 20° C. of 35.9 Pa·s.
Use as Adhesion Promoter
Activator-1

2.5 g of aldiminosilane A-1 were dissolved in 250 g of dry ethyl acetate and stored with exclusion of moisture.
Activator-2

2.5 g of aldiminosilane A-2 were dissolved in 250 g of dry ethyl acetate and stored with exclusion of moisture.
Composition Z-1

1.5 g of aldiminosilane A-1 were mixed under a nitrogen atmosphere with 150 g of polymer P1 and stored with exclusion of moisture. The mixed composition had a viscosity at 20° C. of 36.4 Pa·s after one day under standard climatic conditions. After storage in a closed container in an air circulation oven at 60° C. for 7 days, the viscosity was 44.3 Pa·s at 20° C.

Composition Z-2

1.5 g of aldiminosilane A-2 were mixed under a nitrogen atmosphere with 150 g of polymer P1 and stored with exclusion of moisture.

As a measure of action as adhesion promoter, spacer tape was applied longitudinally to two glass plates (float glass; from Rocholl, Schönbrunn, Germany) having dimensions of 10×15 cm on the air side so as to give three glass strips each of 2×8 cm. The first and second strips were each wiped once with an ethyl acetate-soaked hygiene wipe. The third strip was wiped once with a hygiene wipe wetted with activator-1 and with activator-2. Subsequently, the glass plates treated in this way were stored under standard climatic conditions for flashoff for 2 h. Then 6 g of polymer P1 were applied in a layer thickness of about 3 mm to each of the first and third strips. 6 g of composition Z-1 or of composition Z-2 were applied to the second strip in a layer thickness of about 3 mm.

The glass plates thus coated were stored under standard climatic conditions for 7 days and then attempts were made to detach the cured polymer films from the glass plate. The bonding was described as "very good" when the cured polymer could not be removed from the glass substrate. (Even after several cuts transverse to the strip direction down to the glass substrate, by which the polymer was cut away from the glass, and pulling the polymer strip away vertically, it was not possible to detach the polymer from the glass substrate.) The bonding was described as "none" when the cured polymer could be fully detached from the glass substrate.

The results are shown in tables 1 and 2.

TABLE 1

| Pretreatment | Polymer strip | Bonding |
| --- | --- | --- |
| Ethyl acetate | Polymer P1 | none |
| Ethyl acetate | Composition Z-1 | very good |
| Activator-1 | Polymer P1 | very good |

TABLE 2

| Pretreatment | Polymer strip | Bonding |
| --- | --- | --- |
| Ethyl acetate | Polymer P1 | none |
| Ethyl acetate | Composition Z-2 | very good |
| Activator-2 | Polymer P1 | very good |

Primer Compositions Z-3 and Z-4:

125.0 g of Sika® Primer-209 N (pigmented primer containing isocyanate groups, from Sika Schweiz AG) was mixed with 11.09 g of aldiminosilane A-1 (=primer composition Z-3) or 10.94 g of aldiminosilane R-1 (=primer composition Z-4) and stored with exclusion of moisture.

Examples 1 to 3

Primer compositions Z 3 and Z-4 were used as adhesion promoters on glass: a long flashoff time of 30 hours or 7 days was followed by application of Sikaflex®-250 DM-5 (one-component moisture-curing polyurethane adhesive, from Sika Switzerland AG) and curing thereof, and the bonding thereof was tested. The reference used was Sika® Primer-209 N.

For each test, a glass plate was cleaned with isopropanol, wiped with a hygiene wipe soaked with Sika® Aktivator-100 (adhesion-promoting cleaner, from Sika Schweiz AG) and, after a flashoff time of 10 min, the respective primer composition was applied in a thin layer with a sponge. After a flashoff time of 32 hours or 7 days under standard climatic conditions, Sikaflex®-250 DM-5 that had been preheated to 60° C. was applied in the form of a triangular bead of width 10 mm and length 100 mm to the primer layer and the glass plate was stored under standard climatic conditions for 7 days, in the course of which the adhesive applied cured. Subsequently, the bonding of the adhesive bead on the glass plate was tested by making an incision into the bead at the end just above the bonding surface, holding the cut end of the bead with rounded tweezers and trying to pull the bead away from the substrate. Then the bead was incised again down to the substrate, the part of the bead that had been cut away was rolled up with the rounded tweezers and an attempt was again made to pull the bead away from the substrate. In this way, the bead was cut away from the substrate by pulling over a length of 80 mm. Subsequently, bonding was assessed with reference to the failure profile using the following scale:

1 (=very good) represents more than 95% cohesive failure
2 (=good) represents 75% to 95% cohesive failure
3 (=moderate) represents 25% to 75% cohesive failure
4 (=poor) represents less than 25% cohesive failure
5 (=no adhesion) represents 0% cohesive failure or 100% adhesive failure The results are reported in table 3.

Examples 2 and 3 marked (Ref.) are comparative examples.

TABLE 3

| | | Example: | |
| --- | --- | --- | --- |
| | 1 | 2 (Ref.) | 3 (Ref.) |
| | | Primer composition | |
| Flashoff time: | Z-3 | Z-4 | Sika ® Primer-209 N |
| Bonding of Sikaflex ® 250 DM-5   32 h | 1 | 1 | 2 |
| 7 d | 1 | 5 | 1 |

The invention claimed is:

1. An aldiminosilane of the formula (I)

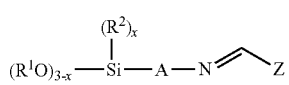

(I)

where x is 0 or 1 or 2, $R^1$ is a monovalent aliphatic or cycloaliphatic or arylaliphatic hydrocarbyl radical optionally containing ether groups and having 1 to 12 carbon atoms, $R^2$ is a monovalent hydrocarbyl radical having 1 to 12 carbon atoms, A is an alkylene radical optionally having ether oxygen or amine nitrogen and having 1 to 12 carbon atoms, and Z is a radical of the formula (II)

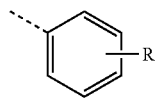
(II)

where R is selected from the group consisting of branched 4-decyl, branched 4-undecyl, branched 4-dodecyl, branched 4-tridecyl and branched 4-tetradecyl radicals.

2. An aldiminosilane as claimed in claim 1, wherein $R^1$ is methyl or ethyl.

3. An aldiminosilane as claimed in claim 1, wherein A is selected from the group consisting of methylene, 1,3-propylene, 4-aza-1,6-hexylene, 4,7-diaza-1,9-nonylene, 2-methyl-1,3-propylene, 1,4-butylene, 3-methyl-1,4-butylene and 3,3-dimethyl-1,4-butylene, where the numbering starts from the silicon atom.

4. A process for preparing aldiminosilanes as claimed in claim 1, in which at least one aminosilane of the formula (III) is combined with at least one aldehyde of the formula (IV) to form a reaction mixture, using the aldehyde stoichiometrically or in stoichiometric excess in relation to the primary amino group of the aminosilane,

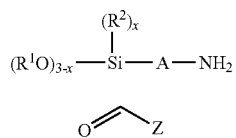

and the water of condensation is removed from the reaction mixture by a suitable method, optionally with heating thereof.

5. A process for preparing aldiminosilanes as claimed in claim 1, in which at least one aldehyde of the formula (IV) is first combined with a volatile primary monoamine to form a reaction mixture, using the aldehyde stoichiometrically or in stoichiometric excess in relation to the primary amino group,

(IV)

the water of condensation and any excess amine are removed from the reaction mixture by a suitable method, optionally with heating thereof, then the resulting aldimine intermediate is combined with at least one aminosilane of the formula (III) to form a reaction mixture, using the aminosilane stoichiometrically or in stoichiometric excess in relation to the aldimino group of the aldimine intermediate,

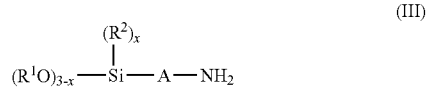
(III)

and finally the reaction mixture is heated and the volatile primary monoamine released and any excess aminosilane is removed from the reaction mixture.

6. A method comprising applying at least one aldiminosilane as claimed in claim 1 as an adhesion promoter and/or crosslinker.

7. An aldiminosilane composition comprising an aldiminosilane of the formula (I)

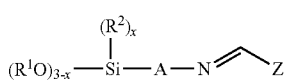
(I)

where
x is 0 or 1 or 2,
$R^1$ is a monovalent aliphatic or cycloaliphatic or arylaliphatic hydrocarbyl radical optionally containing ether groups and having 1 to 12 carbon atoms,
$R^2$ is a monovalent hydrocarbyl radical having 1 to 12 carbon atoms,
A is an alkylene radical optionally having ether oxygen or amine nitrogen and having 1 to 12 carbon atoms, and
Z is an aryl radical substituted by an alkyl or alkoxy group and having a total of 12 to 26 carbon atoms, and
at least one monomer and/or polymer having crosslinkable reactive groups.

8. The aldiminosilane composition as claimed in claim 7, wherein the aldiminosilane composition contains isocyanate groups that comprise at least one polyisocyanate and/or at least one polymer containing isocyanate groups.

9. The aldiminosilane composition as claimed in claim 7, wherein the composition is an adhesive or a sealant or a coating.

10. The aldiminosilane composition as claimed in claim 7, wherein the composition is a primer.

* * * * *